United States Patent [19]

Beugelsdyk et al.

[11] Patent Number: 4,466,232

[45] Date of Patent: Aug. 21, 1984

[54] LAWNMOWER CONTROL ASSEMBLY

[75] Inventors: Anthony F. Beugelsdyk; Michael A. Barnard, both of Wichita, Kans.

[73] Assignee: Conchemco, Incorporated, Lenexa, Kans.

[21] Appl. No.: 459,823

[22] Filed: Jan. 21, 1983

[51] Int. Cl.³ ............................................. A01D 50/02
[52] U.S. Cl. ..................................... 56/10.8; 56/11.3; 56/11.8; 180/19.3
[58] Field of Search ...................... 56/11.3, 11.8, 10.8, 56/11.7; 180/19.3

[56] References Cited

U.S. PATENT DOCUMENTS

| | | | |
|---|---|---|---|
| 3,651,709 | 3/1972 | Booty et al. | 74/483 R |
| 3,942,604 | 3/1976 | Black | 180/19.3 |
| 4,132,280 | 1/1979 | Jones et al. | 180/19.3 |
| 4,155,418 | 5/1979 | Tremblay et al. | 180/272 |
| 4,167,221 | 9/1979 | Edmonson et al. | 180/19.3 |
| 4,212,141 | 7/1980 | Miyazawa et al. | 56/11.3 |
| 4,212,363 | 7/1980 | Letner et al. | 180/19.3 |
| 4,230,200 | 10/1980 | Carolan | 180/19.3 |
| 4,281,732 | 8/1981 | Hoch | 56/11.8 |
| 4,309,862 | 1/1982 | Carlson | 56/11.3 |
| 4,327,539 | 5/1982 | Bricko et al. | 56/11.3 |
| 4,335,566 | 6/1982 | Hurd | 56/11.3 |
| 4,362,228 | 12/1982 | Plamper et al. | 56/11.3 |
| 4,363,206 | 12/1982 | Schmitt | 56/11.3 |
| 4,394,893 | 7/1983 | Kronich et al. | 192/3 S |
| 4,413,466 | 11/1983 | Beugelsdyk et al. | 56/11.3 |
| 4,466,308 | 8/1984 | Kester et al. | 74/483 |

Primary Examiner—Gene Mancene
Assistant Examiner—David I. Tarnoff
Attorney, Agent, or Firm—Schmidt, Johnson, Hovey & Williams

[57] ABSTRACT

A compact, safety control assembly for lawnmowers having a cable actuated clutch between the motor and blade is provided which includes a "dead man" function along with an operating mechanism requiring two distinct steps for engaging the clutch and initiating rotation of the lawnmower blade. The control apparatus preferably includes a clutch cable biased to a clutch-disengaged position, a first handle engageable with the clutch cable for shifting the cable to a clutch-engaged position, a second movable handle for releasably retaining the clutch cable in the clutch-engaged position, a spring for yieldably biasing the second handle to a position wherein the clutch cable is released from the second handle means, and a shiftable detent that prevents shifting movement of the first handle means when the second handle means is in its normal, biased position. Two control assemblies of the type disclosed may be used in tandem on lawnmowers having a clutch-engaged blade and a clutch-engaged ground drive.

6 Claims, 9 Drawing Figures

LAWNMOWER CONTROL ASSEMBLY

BACKGROUND OF THE INVENTION

1. Field of the Invention

The present invention is concerned with an improved control apparatus for us on walk-behind lawnmowers of the type having a clutch interposed between the motor and blade thereof, and having an elongated cabler for clutch operation. More particularly, it is concerned with such a control apparatus which provides a desirable "dead man" function, along with a two-step procedure for engaging the clutch and initiating blade rotation.

2. Description of the Prior Art

So-called walk-behind rotary powered mowers are well known and in widespread use. Generally speaking, such mowers include a lowermost housing supported on spaced wheels, with a gasoline powered engine coupled to a rotary mower blade disposed within the housing. An elongated handle is affixed to the housing at the rear thereof, so that the user simply pushes the mower in a "walk-behind" fashion.

In recent years the government has promulgated a number of safety regulations relating to mowers of the type described. For example, such mowers must now be equipped with a so-called "dead man" switch which generally includes a spring-biased handle grasped by the operator during normal operation of the mower. If the handle is thereafter released, mowing action is rapidly terminated for reasons of safety. Such termination may be by way of stopping the motor, or through a clutch mechanism operatively coupled with the handle which disengages the blade from the motor when the handle is released.

In addition, it has now been proposed that walk-behind mowers be provided with a control apparatus requiring two distinct actions to restart the rotary blade thereof when it has ceased operation.

In view of these regulations, there has been considerable effort on the part of mower manufacturers and suppliers to develop a low cost, compact, reliable and easy to use control apparatus which meets the new regulations.

SUMMARY OF THE INVENTION

The present invention relates to a control apparatus for walk-behind mowers which satisfies all presently existing and proposed safety standards. Broadly speaking, the apparatus hereof includes a cable end portion biased towards a clutch-disengaged position and shiftable to a clutch-engaged position, first handle means engageable with the cable end portion for shifting of the end portion to a clutch-engaged position, second handle means coupled to an operating mechanism for selectively, releaseably retaining the cable end portion in a clutch-engaged postion, and detent means for preventing shifting of the first handle means when the coupling means is not in a cable-retaining position.

DESCRIPTION OF THE PREFERRED EMBODIMENT

Figure 1:
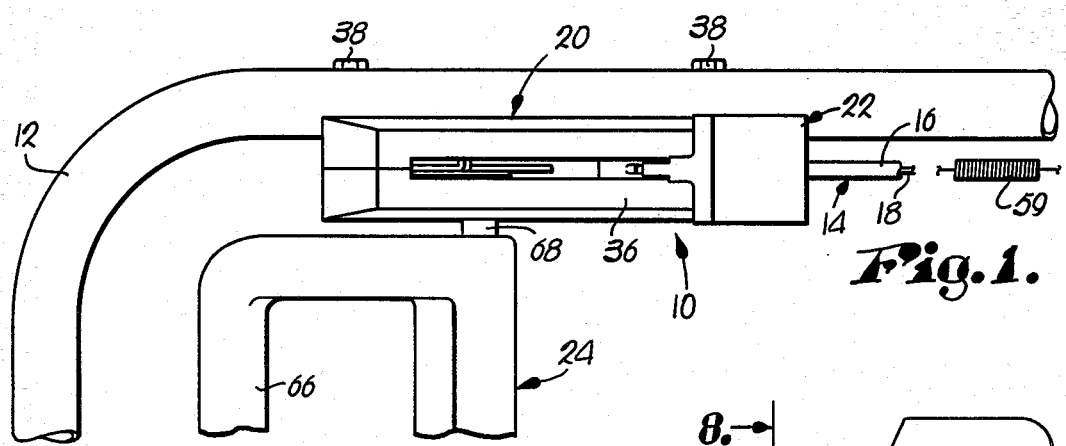
FIG. 1 is a fragmentary top view illustrating a control apparatus in accordance with the present invention, mounted on the main handle of a walk-behind powered lawnmower.

Referring to the drawings, a control apparatus 10 is depicted as it would appear when operatively mounted on the U-shaped main handle 12 of a walk-behind powered lawnmower. A clutch actuating cable 14 extends from apparatus 10 and is operatively connected to a conventional clutch unit coupled between the lawnmower motor and the rotary blade thereof (not shown). The cable 14 is likewise of conventional construction, and includes an outercasing 16 and an internal longitudinally shiftable metallic element 18.

The control apparatus 10 broadly includes a housing 20, first handle means 22, second handle means 24, a detent 26, and a cable retaining mechanism 28.

In more detail, housing 20 includes a pair of spaced apart, irregularly shaped sidewalls 30, 32, bottom wall 34, and a slotted top wall 36. The housing 20 is advantageously formed of an appropriate synthetic resin material, and is coupled to handle 12 by means of appropriate bolts or other fasteners 38.

The sidewalls 30, 32 include a pair of elongated, inwardly extending projections 40, 42 that cooperatively define an irregularly shaped elongated guide passage 44 on each sidewall. Sidewall 30 includes an inwardly extending, upwardly oriented, detent-engaging projection 46. Each sidewall 30, 32 also includes a plurality of inwardly projecting lugs 48 for mating engagement of the sidewalls 30, 32. Sidewall 32 includes a spring retaining lug 50 that is received within indent 52 of sidewall 30.

Cable 14 is received within housing 20 at aperture 54, and is retained therein by a fitting 56 fitted on to the end of cable outer casing 16. Metallic element 18 terminates within the housing 20 with a T-shaped cable end portion 58. Spring 59 is attached to the end of metallic element 18 spaced apart from housing 22.

Figure 2:
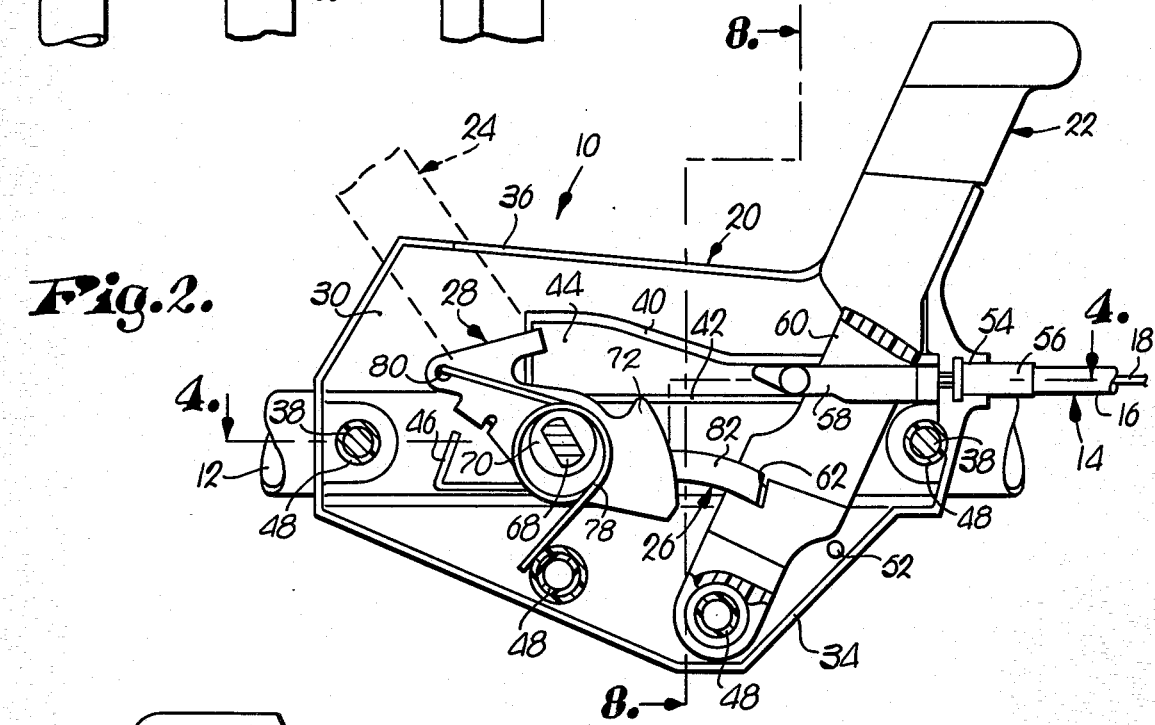
FIG. 2 is a vertical sectional view of the control apparatus with parts broken away for clarity, dashed lines indicating the position of the second handle means.
Figure 6:
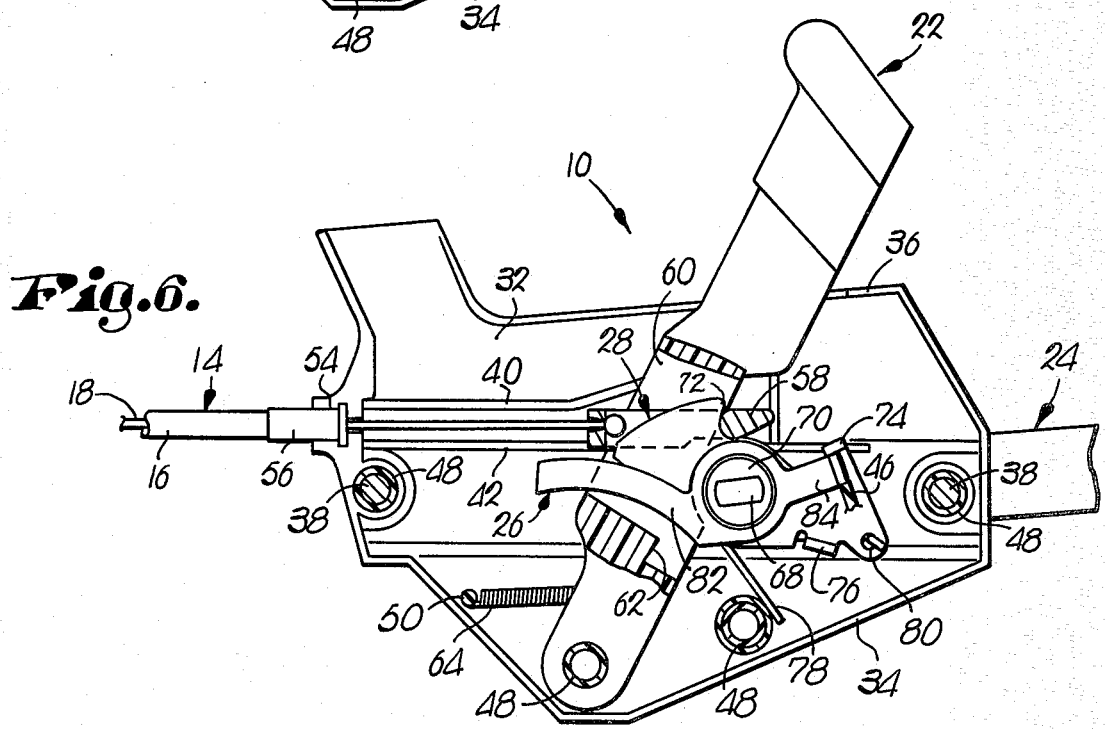
FIG. 6 is a vertical sectional view of the control apparatus with parts broken away for clarity, the first handle means being in its shifted position and the clutch cable being in the clutch-engaged position.
Figure 7:
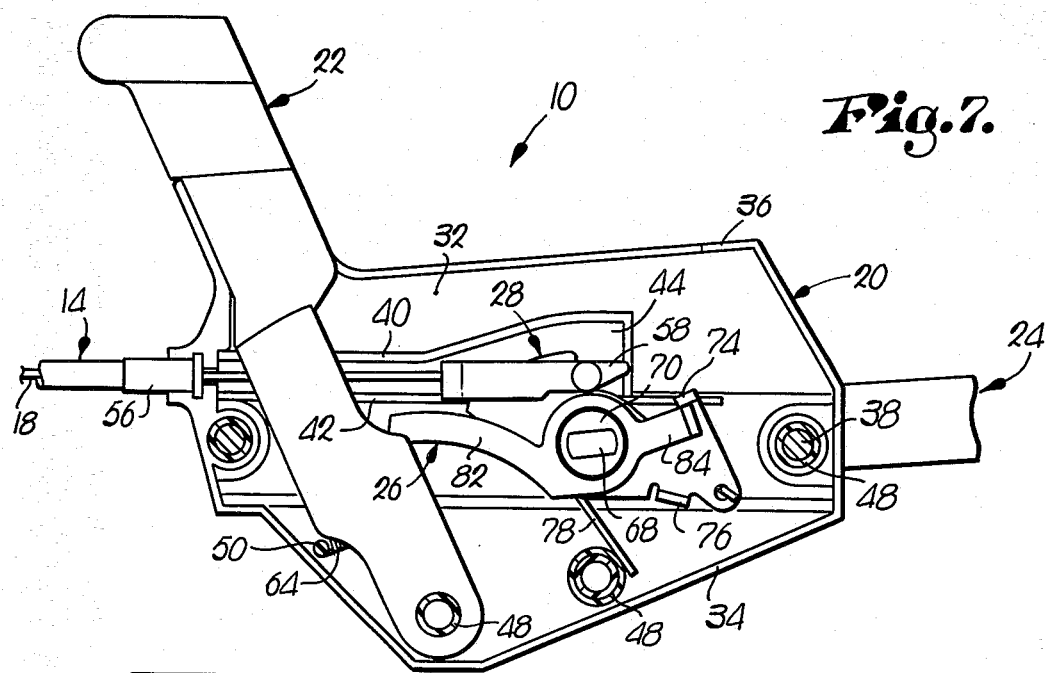
FIG. 7 is a vertical sectional view of the control apparatus with the clutch cable in its clutch-engaged position and the first handle in the rest position.
Figure 8:
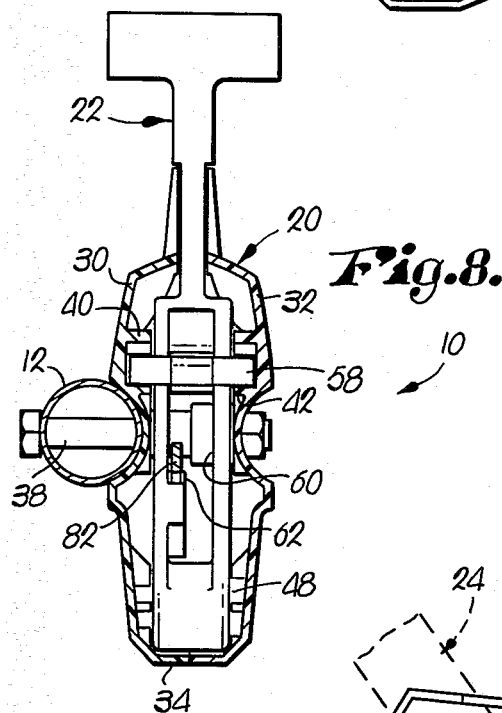
FIG. 8 is a sectional view of the control apparatus taken along line 8—8 of FIG. 2.

First handle means 22 comprises a lever arm pivotally mounted around the lowermost lug 48. The handle means 22 includes an elongated, centered aperture 60 through which the T-shaped cable end portion 58 is received, and a detent-receiving stop surface 62. The handle 22 is shiftable from a rest position, as depicted for example in FIG. 2 to a shifted position as depicted in FIG. 6, and biased towards the rest position by a spring 64 extending from the handle 22 to the spring retaining lug 50.

The second handle means 24 is preferably in the form of a bail member 66 that is mounted on an elongated pivot pin 68 that extends through and is supported by the housing 20. The handle 24 is shiftable between a released position as depicted for example in FIG. 3, and a grasped position as depicted for example in FIG. 5.

Retaining mechanism 28 includes a mounting sleeve 70 through which the pivot pin 68 of handle 24 is received and engaged for pivotal motion therewith. The retaining mechanism 28 includes a cable end portion-receiving hook 72, and a pair of detent-engaging lugs 74, 76. Biasing spring 78 is received through aperture 80 of retaining mechanism 28 such that second handle 24 is biased towards the released position.

Detent 26 is positioned on the sleeve 70 of retaining mechanism 28 for independent pivotal rotation thereabout. Detent 26 includes a curved, elongated arm 82 engageable with stop surface 62 of first handle means 22, and a second, retaining mechanism-engaging arm 84 engageable by lugs 74, 76 of retaining mechanism 28.

Figure 9:
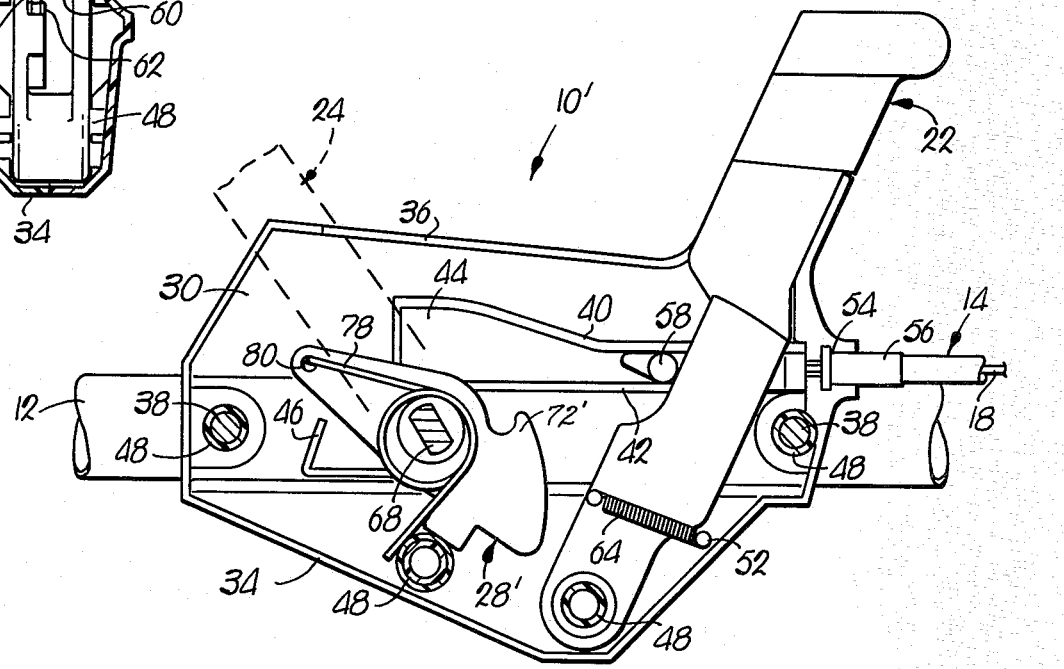
FIG. 9 is a sectional view of a second embodiment of the control apparatus.

Referring to FIG. 9 a second embodiment of the control apparatus in accordance with the present invention is depicted. It will be noted that the second embodiment is similar to the first embodiment in most respects, and similar parts are numbered in FIG. 9 as they are in the drawings of the first embodiment. The second embodiment differs from the first embodiment in that it does not include a detent member, and in the configuration of the retaining mechanism 28'. Retaining mechanism 28' does not include detent-engaging lugs as are included in the first embodiment, and the hook 72' of detaining mechanism 28' is configured to have a deeper arch than the hook 72 of the first embodiment.

The operation of control apparatus 10 will now be described, and particularly with reference to FIGS. 3 and FIGS. 5-7, which illustrate an operational sequence.

Figure 3:
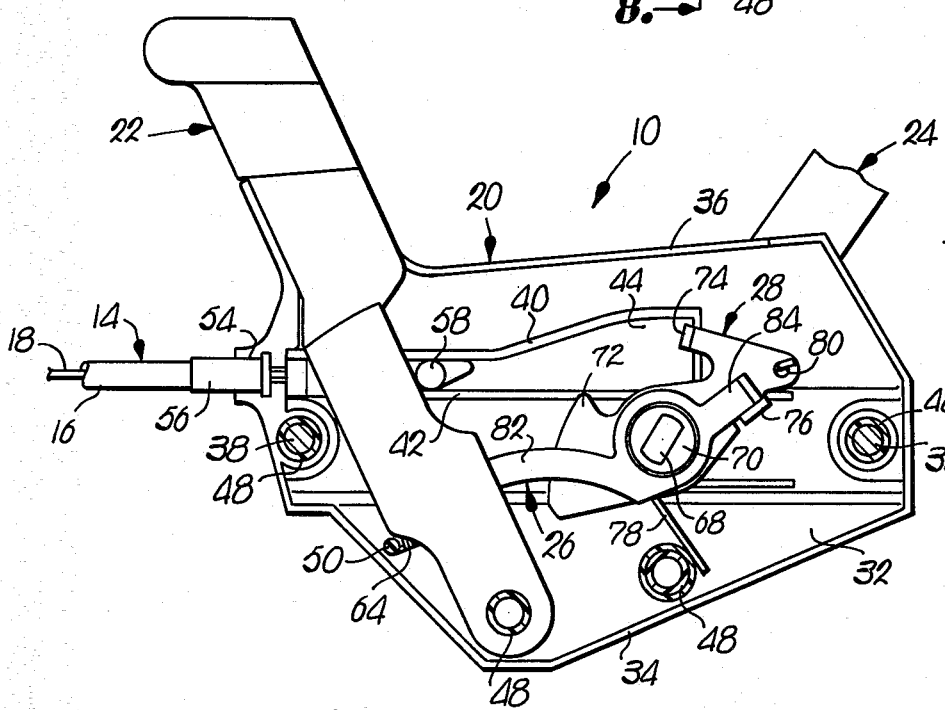
FIG. 3 is a vertical sectional view of the control apparatus.
Figure 4:
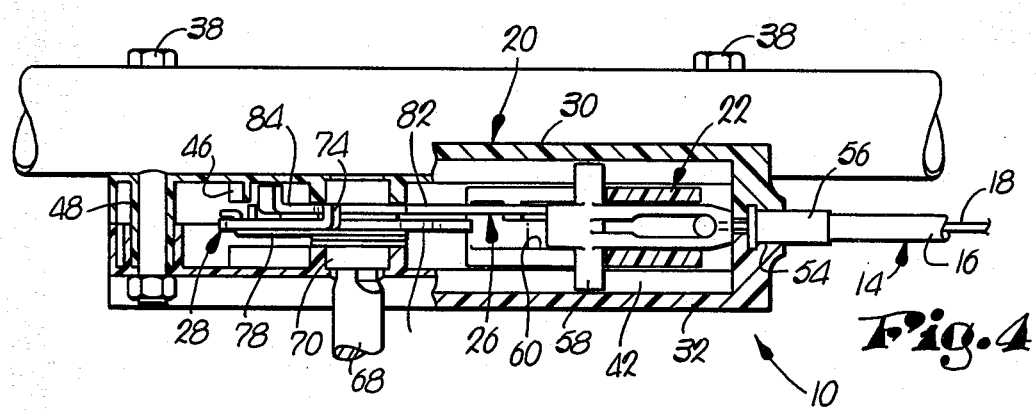
FIG. 4 is a top sectional view taken along the line 4—4 of FIG. 2.

Referring first to FIG. 3, the first handle means 22 are depicted in the rest position, and the second handle means 24 is depicted in the released position. Retaining mechanism 28 is biased in a counterclockwise direction as depicted in FIG. 3, by spring 78 such that lug 76 engages arm 84 of detent 26, biasing arm 82 of detent 26 into engagement with the stop surface 62 of lever arm 22.

Figure 5:
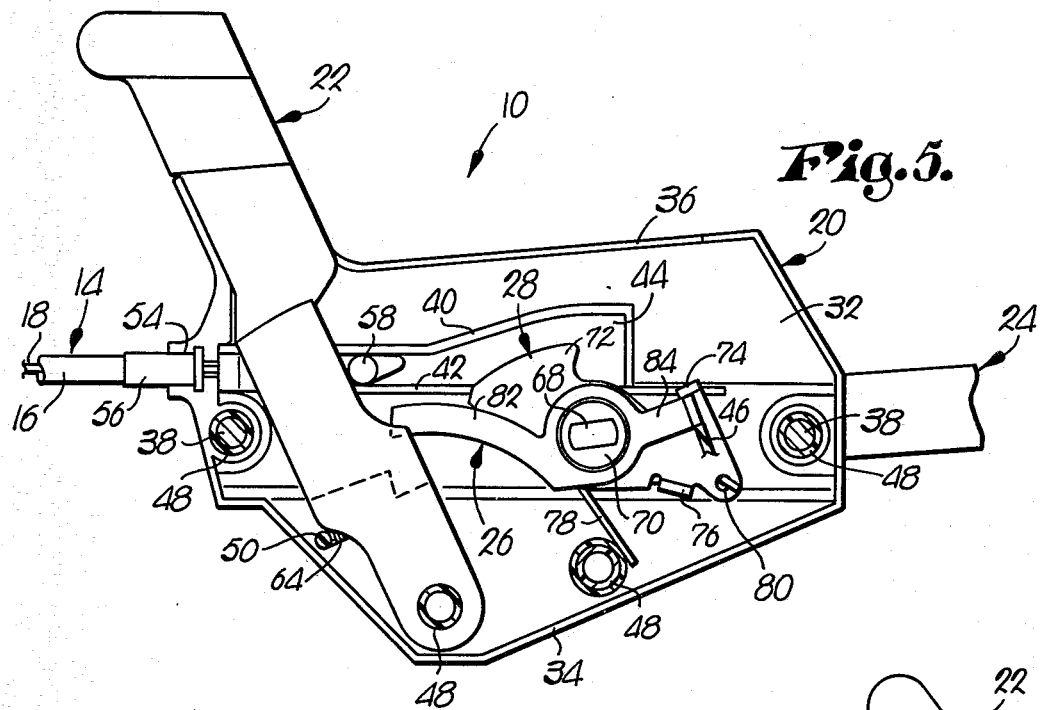
FIG. 5 is a vertical sectional view of the control apparatus with the detent shown in the cleared position.

The first step in engaging the clutch of the lawnmower comprises manually shifting second handle means 24 from the released position as depicted in FIG. 3 to the grasped position as depicted in FIG. 5. As second handle means 24 is shifted to the grasped position, retaining mechanism 28 is shifted in a clockwise rotation, as depicted in FIG. 5, such that lug 74 of retaining mechanism 28 engages arm 84 of detent 26, thereby rotating detent 26 in a clockwise direction and shifting detent 26 to a position where arm 82 of the detent clears stop surface 62 of the handle means 22.

Once the detent 26 is cleared from the stop surface 62 of first handle means 22, handle means 22 is grasped and pulled rightwardly as viewed in FIGS. 5-6. The cross piece of T-shaped cable end portion 58 is engaged by the handle 22, such that the cable end portion, and thereby metallic element 18 of cable 14, is shifted rightwardly from a first position depicted in FIG. 5 to a second position depicted in FIG. 6.

At the end of the rightward travel of cable end portion 58 (see FIG. 6) the cross piece of the end portion 58 rides up over the retaining mechanism 28 and is retained within the hook 72 of the retaining mechanism 28.

The first handle 22 is next shifted back leftwardly to its original, rest position (see FIG. 7), such being facilitated by spring 64. However, the return of handle 22 to the rest position does not alter the interlocking relationship of the cable end portion 58 within the hook 72 of retaining mechanism 28, and thus it will be appreciated that the motor clutch remains engaged. In this operational mode, the motor can be used in the normal fashion.

In the event the mower operator releases bail 66, spring 78 will shift the retaining mechanism 28 in a counterclockwise direction, and second handle 24 will be shifted from its grasped position to its released position. This in turn causes the cross piece of cable end portion 58 to come out of engagement with hook 72 of retaining mechanism 28, and the cable end portion 58 and metallic element 18 is thereby shifted from its second, engaged position to its first, non-engaged position by spring 59. Shifting of the metallic element 18 in this manner disengages the clutch of the lawnmower.

The second embodiment 10' of the present invention may be used in conjunction with the first embodiment of the control apparatus 10 on powered lawnmowers having both a clutch-engaged blade and a clutch-engaged ground drive mechanism. No detent is included in the second embodiment of the apparatus 10', since government regulations do not require a "two-step" clutch-engagement of powered ground drives for lawnmowers.

A comparison of FIG. 9 with the drawings depicting the first embodiment reveals that the hook 72 on the retaining mechanism 28 of the first embodiment is of a shallower depth than the hook 72' of the retaining mechanism 28' on the second embodiment. When used in tandem, the first handle means 22 of apparatus 10 and 10' would comprise first and second shiftable handles respectively. The handle means 24 would be oriented so as to be common to both of the clutch control apparatus, and would comprise a third operating handle means to the combined clutch apparatus. One clutch apparatus would be connected via cable 14 to the rotor engaging clutch, and the second clutch control apparatus would be connected via its cable 14 to the ground drive clutch. Operation of the two clutch control apparatus would be as described above, although it will be apparent that the handle 22 of clutch apparatus 10' may be shifted from its rest position to its shifted position without the necessity of disengaging a detent.

As described above, the hook 72 of control apparatus 10 is of a shallower depth than the hook 72' of control apparatus 10'. Also as described above, when used in tandem, the handle means 24 is common to both control apparatus 10 and 10'. It will be apparent, therefore, that when the handle 24 is shifted along a path of travel from its grasped position to its released position, the cable end portion 58 retained by hook 72 will become disengaged from the retaining mechanism 28 at a point in the path of travel of the handle 24 prior to the disengagement of the cable end portion retained by the hook 72'. In this manner, it is possible for the operator to disengage the rotor blade without disengaging the motor ground drive clutch.

We claim:

1. A control apparatus comprising:
    first handle means movable between a rest position and a shifted position;
    second handle means swingable about a pivot pin between a released position and grasped position;

cable means shiftable between a first and second position, and having a cable end portion including structure engageable by said first handle means for shifting of said cable means from said first to said second position thereof;

means for biasing said cable means to said first position;

detent means independently rotatable about said pivot pin, said detent means being rotatable from a position corresponding to said released position of said second handle means wherein said first handle means is detained in said rest position by a portion of said detent means, to a position corresponding to said grasped position of said second handle means wherein said portion of the detent means clears said first handle means in spaced apart relationship thereto; and retainer mechanism coupled with said pivot pin and shiftable thereabout when said second handle is swung, said retainer mechanism including parts for engaging said detent means to rotate the same between said positions, said retainer mechanism also including a part for holding said cable end portion in said second position when said second handle means is retained in said grasped position, and for releasing said cable end portion when said second handle means is swung to said released position.

2. An apparatus as set forth in claim 1, said second handle means including structure oriented for grasping by the operator of said apparatus to maintain said second handle means in said grasped position.

3. An apparatus as set forth in claim 1, said first handle means comprising an elongated lever pivotally movable about one end thereof, and including structure defining an aperture therethrough, said cable being received through said aperture.

4. An apparatus as set forth in claim 1, including means for biasing said second handle means to said released position.

5. An apparatus as set forth in claim 1, including means biasing said first handle means to said rest position.

6. An apparatus as set forth in claim 1, said portion of the detent means including an elongated arm, and said first lever including a stop surface engageable by said arm.

* * * * *